(12) United States Patent
Winn (10) Patent No.: US 8,035,246 B2
(45) Date of Patent: Oct. 11, 2011

(54) TORQUE LIMITING COUPLING FOR WIND TURBINE

(75) Inventor: Peter M. Winn, Shrewsbury, MA (US)

(73) Assignee: American Superconductor Corporation, Devens, MA (US)

( * ) Notice: Subject to any disclaimer, the term of this patent is extended or adjusted under 35 U.S.C. 154(b) by 0 days.

(21) Appl. No.: 12/683,877

(22) Filed: Jan. 7, 2010

(65) Prior Publication Data

US 2011/0133470 A1  Jun. 9, 2011

(51) Int. Cl.
*F03D 11/02* (2006.01)
(52) U.S. Cl. ......................................................... 290/55
(58) Field of Classification Search .................. 290/55; 310/77, 78
See application file for complete search history.

(56) References Cited

U.S. PATENT DOCUMENTS

| 4,075,910 | A | 2/1978 | Davis et al. | |
|---|---|---|---|---|
| 5,986,370 | A * | 11/1999 | Cheng | 310/77 |
| 7,042,109 | B2 * | 5/2006 | Gabrys | 290/44 |
| 7,119,453 | B2 | 10/2006 | Bywaters | |
| 7,432,610 | B2 * | 10/2008 | Wobben | 290/44 |
| 7,559,870 | B2 * | 7/2009 | Hicks | 475/257 |
| 7,671,501 | B2 * | 3/2010 | Groening | 310/114 |
| 7,741,746 | B2 * | 6/2010 | Groening | 310/106 |
| 2006/0240930 | A1 * | 10/2006 | Hicks | 475/90 |
| 2008/0078646 | A1 | 4/2008 | Ebata | |
| 2008/0105512 | A1 | 5/2008 | Saeki et al. | |
| 2009/0197719 | A1 * | 8/2009 | Ali et al. | 474/94 |

FOREIGN PATENT DOCUMENTS

| DE | 102008009351 A1 * | 8/2009 |
|---|---|---|
| EP | 1445484 A1 * | 8/2004 |
| FR | 2367943 A * | 6/1978 |
| JP | 2003284285 A * | 10/2003 |

OTHER PUBLICATIONS

"Centa-Transmissions for Wind Energy Applications" *Centa Catalog, CENTA-WIND*, (Mar. 2007).

* cited by examiner

*Primary Examiner* — Joseph Waks
(74) *Attorney, Agent, or Firm* — Occhiuti Rohlicek & Tsao LLP (57) ABSTRACT

A direct-drive power train of a wind power plant is protected from over-torque by a torque limiting device. The power train includes a turbine rotor including a hub and blades supported on the hub, and a generator including a stator and a generator rotor rotatably disposed within the stator. The generator rotor includes a generator rotor body, a rotor shaft, and the torque limiting device connects the generator rotor body to the rotor shaft. The torque limiting device is configured to support the generator rotor body within the stator and allow coaxial rotation of the rotor body relative to the stator. The hub and the generator rotor are connected by the rotor shaft, and the rotor shaft rotates at the same frequency as the hub.

18 Claims, 6 Drawing Sheets

TORQUE LIMITING COUPLING FOR WIND TURBINE

BACKGROUND OF THE INVENTION

Power generation continues to be an important application of rotating electrical machines. Wind energy is one of the fastest growing sources of electricity in the United States and around the world, and wind turbines employing rotating electrical machines are used to convert wind energy to usable power. A conventional wind turbine includes a turbine rotor having turbine blades and output shaft which drive an electrical machine that can supply 3-5 Megawatts of power to the utility power network. Due to the relatively slow rotation of the turbine blades and shaft (up to 15 revolutions per minute), the generator component of a conventional wind turbine includes, along with the electrical generator and control electronics, a gearbox for converting the low speed incoming rotation to high speed rotation suitable for generating electricity. In addition, to protect the turbine blades, output shaft and bearings from instantaneous over-torque due, for example, to pulses from a terminal fault, the turbine output shaft and gearbox may include protection devices such as slip planes as an integral part of the gearbox or as a coupling between the generator rotor and the gearbox.

Increased power demand is leading to increased power requirements for each wind turbine. To obtain a wind turbine that can deliver 8-10 Megawatts, a mere scaling up of the size of the conventional power train becomes impractical, due at least in part to the size, weight and cost of a gearbox which can accommodate these requirements.

SUMMARY

In one aspect, a power train of a wind power plant is provided. The power train includes a turbine rotor including a hub and blades supported on the hub, and a generator including a stator and a generator rotor rotatably disposed within the stator. The generator rotor includes a rotor shaft, a generator rotor body, and a torque limiting device connecting the generator rotor body to the rotor shaft, the torque limiting device configured to support the generator rotor body within the stator and allow coaxial rotation of the rotor body relative to the stator.

The power train may include one or more of the following features: The hub and the generator rotor are connected by the rotor shaft, and the rotor shaft rotates at the same frequency as the hub. The torque limiting device is further configured to disconnect the generator rotor body from the rotor shaft at a predetermined rotor shaft torque. The torque limiting device includes a slip plane. The torque limiting device includes a slip plane disposed between the rotor body and the rotor shaft. The generator rotor body includes a hollow cylindrical portion, and a flange that protrudes radially inward from an inner surface of the cylindrical portion, the flange extending circumferentially about the inner surface. In addition, the torque limiting device includes inner and outer clamping plates, the clamping plates arranged so that a portion of the flange is disposed between the outer and inner clamping plates, and a fastener is configured to draw the outer and inner clamping plates toward each other whereby a portion of each of the outer and inner clamping plates abuts the portion of the flange. The inner clamping plate is fixed to the generator rotor shaft, and the inner and outer clamping plates are fixed relative to the flange for rotor shaft torques of less than a predetermined value, and the inner and outer clamping plates slip relative to the flange for rotor shaft torques of at least a predetermined value. The portion of the inner and outer clamping plates comprises a friction pad attached to a surface thereof. The portion of the inner and outer clamping plates comprises an array of friction pads attached to a surface thereof. The fastener comprises bolts configured to uniformly distribute a compression load across the respective portions of the inner and outer clamping plates and the flange.

In another aspect, a rotor assembly of an electric rotating machine is provided. The rotor assembly a rotor shaft; a rotor body coaxial with and coupled to the rotor shaft; and a rotor support member configured to support the rotor body relative to the rotor shaft, the rotor support member including a torque limiting device configured to decouple the rotor body from the rotor shaft at a predetermined level of torque.

The rotor assembly may include one or more of the following features: The torque limiting device is disposed within the rotor assembly in an area circumscribed by the rotor body, the torque limiting device connecting the rotor body and the rotor shaft. The rotor body includes a hollow cylindrical portion, and a flange that protrudes radially inward from an inner surface of the cylindrical portion, the flange extending circumferentially about the inner surface. In addition, the torque limiting device includes inner and outer clamping plates, the clamping plates arranged so that a portion of the flange is disposed between the outer and inner clamping plates, and a fastener is configured to draw the outer and inner clamping plates toward each other whereby a portion of each of the outer and inner clamping plates abuts the portion of the flange. The inner clamping plate is fixed to the rotor shaft, and the inner and outer clamping plates are fixed relative to the flange for rotor shaft torques of less than a predetermined value, and the inner and outer clamping plates slip relative to the flange for rotor shaft torques of at least a predetermined value. The portion of the inner and outer clamping plates comprises an array of friction pads attached to a surface thereof. The fastener comprises bolts configured to uniformly distribute a compression load across the respective portions of the inner and outer clamping plates and the flange.

In another aspect, an electric rotating machine is provided. The electric rotating machine includes a stator assembly; and a rotor assembly rotatably and coaxially disposed within the stator assembly. The rotor assembly includes a rotor body; a rotor shaft coincident with a longitudinal axis of the rotor body; and a torque limiting device disposed within the rotor assembly in an area circumscribed by the rotor body, the torque limiting device connecting the rotor body and the rotor shaft and configured to decouple the rotor body from the rotor shaft at a predetermined level of torque.

The electric rotating machine may include one or more of the following features: The rotor body includes a hollow cylindrical portion, and a flange that protrudes radially inward from an inner surface of the cylindrical portion, the flange extending circumferentially about the inner surface. In addition, the torque limiting device includes inner and outer clamping plates, the clamping plates arranged so that a portion of the flange is disposed between the outer and inner clamping plates, and a fastener is configured to draw the outer and inner clamping plates toward each other whereby a portion of each of the outer and inner clamping plates abuts the portion of the flange. The inner clamping plate is fixed to the rotor shaft, and the inner and outer clamping plates are fixed relative to the flange for rotor shaft torques of less than a predetermined value, and the inner and outer clamping plates slip relative to the flange for rotor shaft torques of at least a predetermined value. The portion of the inner and outer clamping plates comprises an array of friction pads attached to a surface thereof. The fastener comprises bolts configured to uniformly distribute a compression load across the respective portions of the inner and outer clamping plates and the flange.

A direct drive wind turbine, in which the gearbox is eliminated and the electrical generator is designed to be driven at low frequencies corresponding to that of the turbine rotor, is provided. An overload safety device is employed within the generator rotor as part of the mechanical support of the generator rotor body. The overload safety device can protect the electrical generator as well as the turbine rotor blades, shaft and bearings from instantaneous over-torque caused by pulses from a terminal fault.

In some aspects, the overload safety device is a torque limiting coupling that protects the drive train components of the direct drive generator from instantaneous over-torque. The torque limiting coupling incorporates a friction-type torque-limiting slip plane between the rotor mount flange and the drive shaft. By inserting the torque limiting coupling at this location, the generator rotor is allowed to rotate relative to the drive shaft upon overload. This slip limits the forces experienced by the shaft, bearings, and rotor assembly.

The torque limiting coupling forms a portion of the generator rotor support within the generator stator. This allows for a single bearing support of the rotor within the stator, enabling a compact direct-drive design.

The torque limiting coupling is disposed within an area circumscribed by the rotor body, whereby the overall length of the direct-drive power train is reduced as compared to a conventional, indirect-drive power train in which the coupling is located between the wind turbine and the electrical generator in a gearbox. The reduced length of the direct-drive power train is obtained through reduced drive shaft length and reduced overall length of the nacelle. This is advantageous since it results in a simplified design having reduced weight.

DETAILED DESCRIPTION

Figure 1:
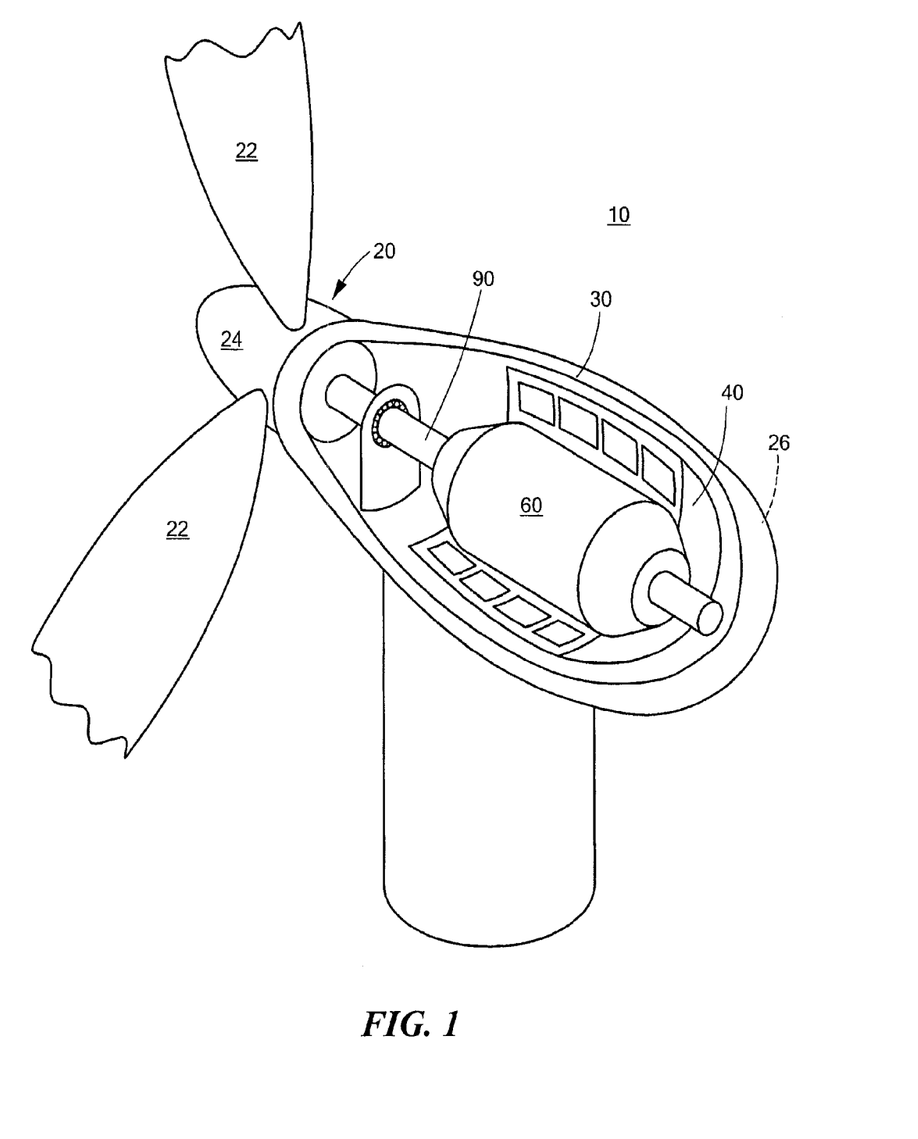
FIG. 1 is a perspective view of a wind turbine.

Referring now to FIG. 1, a wind turbine 10 includes a turbine rotor 20 having blades 22 connected to a hub 24. The wind turbine 10 also includes an electrical generator 30 which is driven by a drive shaft 90 extending between the generator 30 the hub 24. The generator 30 is housed in a nacelle 26, shown partially cut away in FIG. 1 with the turbine rotor 20 protruding through an opening in an end of the nacelle 26. As will be described in greater detail below, the generator 30 is configured for use in low frequency applications, and rotates at the same frequency as the turbine rotor 20. For example, in the illustrated embodiment, the generator 30 is configured to operate at around 11 rpm and generate 8 Megawatts of power.

Figure 2:
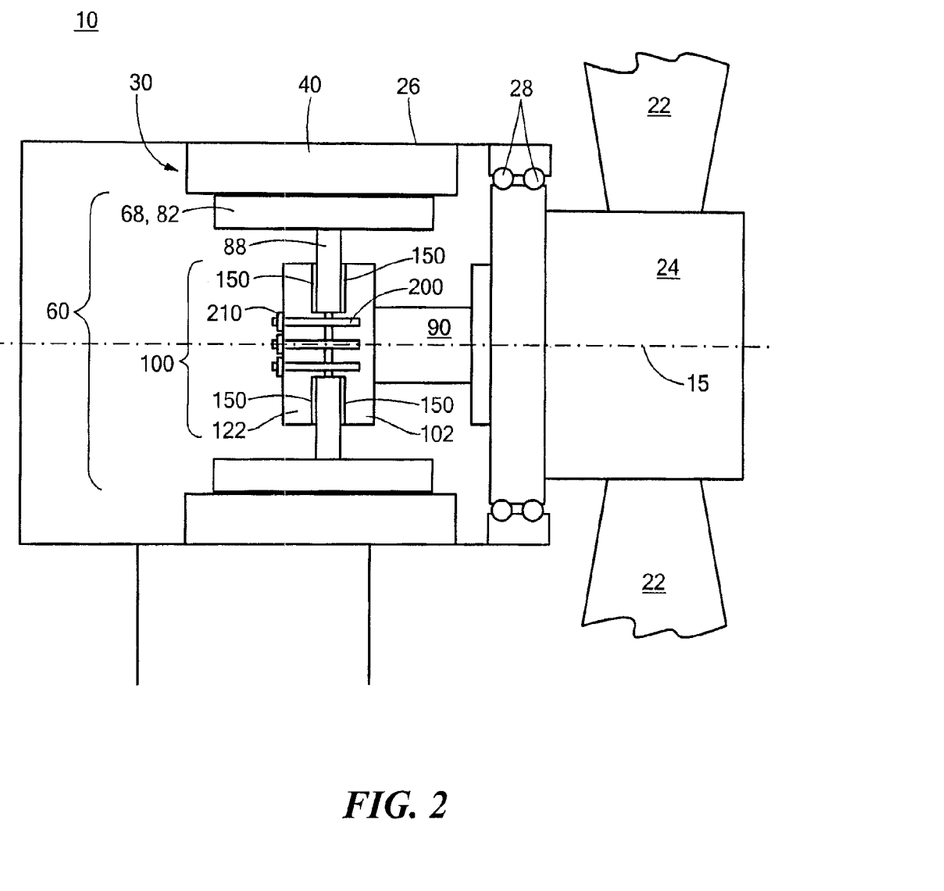
FIG. 2 is a side sectional view of the wind turbine of FIG. 1.

Referring now to FIG. 2, generator 30 is a rotating superconducting machine that includes a rotor assembly 60 and a stator assembly 40. As will be described in greater detail below, the rotor assembly 60 is supported within the stator assembly 40 so that the rotor and stator assemblies are coaxial about a drive shaft 90 and a longitudinal axis 15 of the generator 30.

Figure 3:
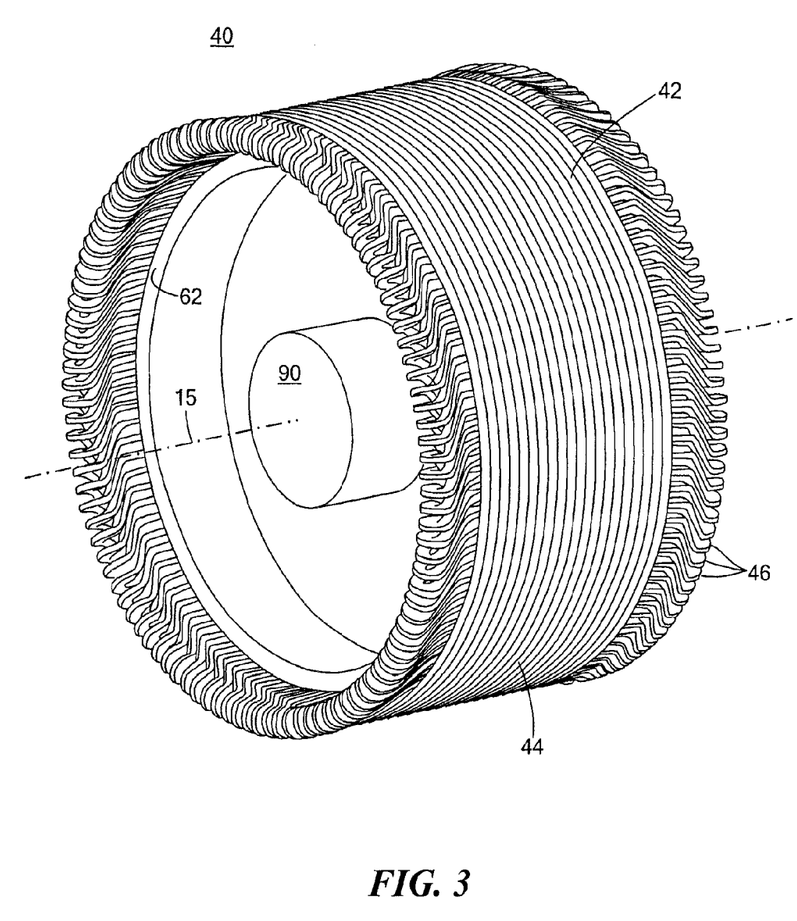
FIG. 3 is a perspective view of the generator stator assembly.

Referring to FIG. 3, the stator assembly 40 includes a stator core 42 and stator windings 46 supported within the stator core 42. The stator core 42 is a hollow cylindrical body formed as an assembly of laminated annular ferromagnetic plates 44. The stator windings are formed of transposed wire cables (not shown), in which the individual copper wire conductors (not shown) are twisted and/or woven to form a pattern which reduces conduction losses. The transposed cables may include Litz wire, Rutherford wire, Robel wire, or any other suitable transposed wire. The transposed cables are wound around an axis transverse to the longitudinal axis 15 of the generator 30 to form an elongated multi-turn stator winding 46 having a conventional shape such as diamond or cranked, and the stator windings 46 are cooled by conventional means.

Figure 4:
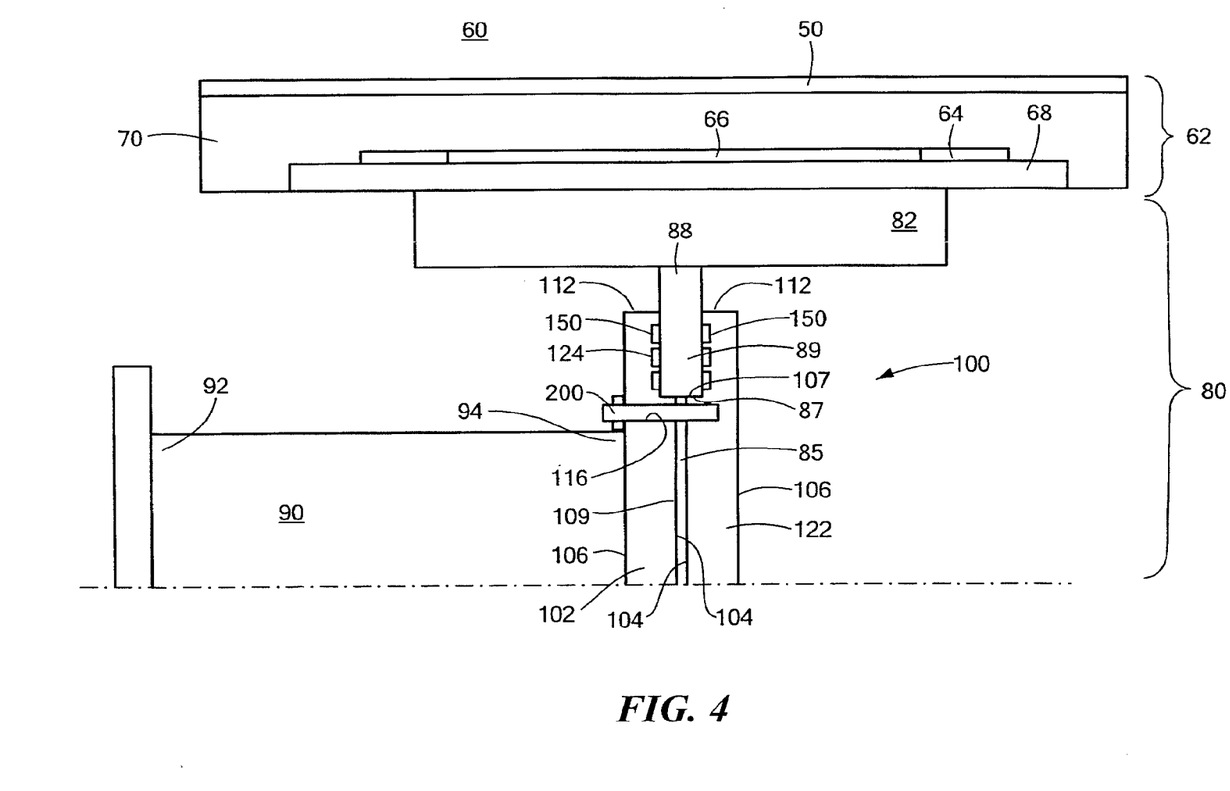
FIG. 4 is a side sectional view of the wind turbine generator.

Referring to FIG. 4, the rotor assembly 60 includes a rotor winding assembly 62 and a torque transfer assembly 80 which are surrounded by an electromagnetic shield 50. The electromagnetic shield 50 includes a conductive, non-magnetic material that shields rotor windings 64 within the rotor winding assembly 62 by attenuating asynchronous fields produced by the stator currents. In addition, the electromagnetic shield 50 shields the rotor winding assembly 62 from heat generated in the stator assembly 40.

The rotor winding assembly 62 includes multiple rotor windings 64, each formed of a high-temperature superconductor (HTS) wound around a mandrel 66. Although other configurations are possible, the rotor windings 64 of this embodiment include several HTS sub-coils formed in a racetrack configuration. U.S. Pat. No. 6,509,819, the entire contents of which are incorporated herein by reference, discusses exemplary rotor coil configurations in more detail. The rotor windings 64 and mandrel 66 are disposed on a cylindrical rotor winding support tube 68, and the rotor windings 64, mandrel 66 and rotor winding support tube 68 are all enclosed within a cryostat 70.

The rotor windings 64 are conduction cooled through the rotor support tube 68. In some embodiments, cooling tubes (not shown) are welded to the outer surface of the rotor support tube 68 intermediate the rotor windings 64. In other embodiments, the cooling tubes may be disposed on the mandrel 66 and/or windings 64 themselves. Alternatively, other methods for cooling the rotor windings 4 may be substituted for the cooling tube arrangement. For example, in some embodiments, gaseous helium is circulated inside the cryostat 70 to cool the rotor windings 64. The coolant supply lines (not shown) that permit inward and outward flow of the gaseous helium to the rotor winding assembly 62 pass through a coaxial helium transfer coupling (not shown), which is a stationary-to-rotating union.

The torque transfer assembly 80 is disposed radially inward relative to the rotor winding assembly 62, and rotatably and coaxially supports the rotor assembly 60 within the stator assembly 40. In addition, the torque transfer assembly 80 supports the rotor winding assembly 62 and transfers the rotational forces generated by the rotor winding assembly 62 to a drive shaft 90.

The torque transfer assembly 80 includes a rotor body 82 which supports and positions the support tube 68 relative to the stator assembly 40, the drive shaft 90, and a torque limiting coupling 100 which connects the rotor body 82 to the drive shaft 90. One end 94 of the drive shaft 90 is connected to the rotor body 82 via the torque limiting coupling 100. The opposed end 92 of the drive shaft 90 is supported by the nacelle 26 through support bearings 28 (best seen in FIG. 2). The rotor body 82, torque limiting coupling 100 and drive shaft 90 reside outside the cold space defined by the cryostat 70, and thus operate at ambient temperature.

Figures 5, 6:
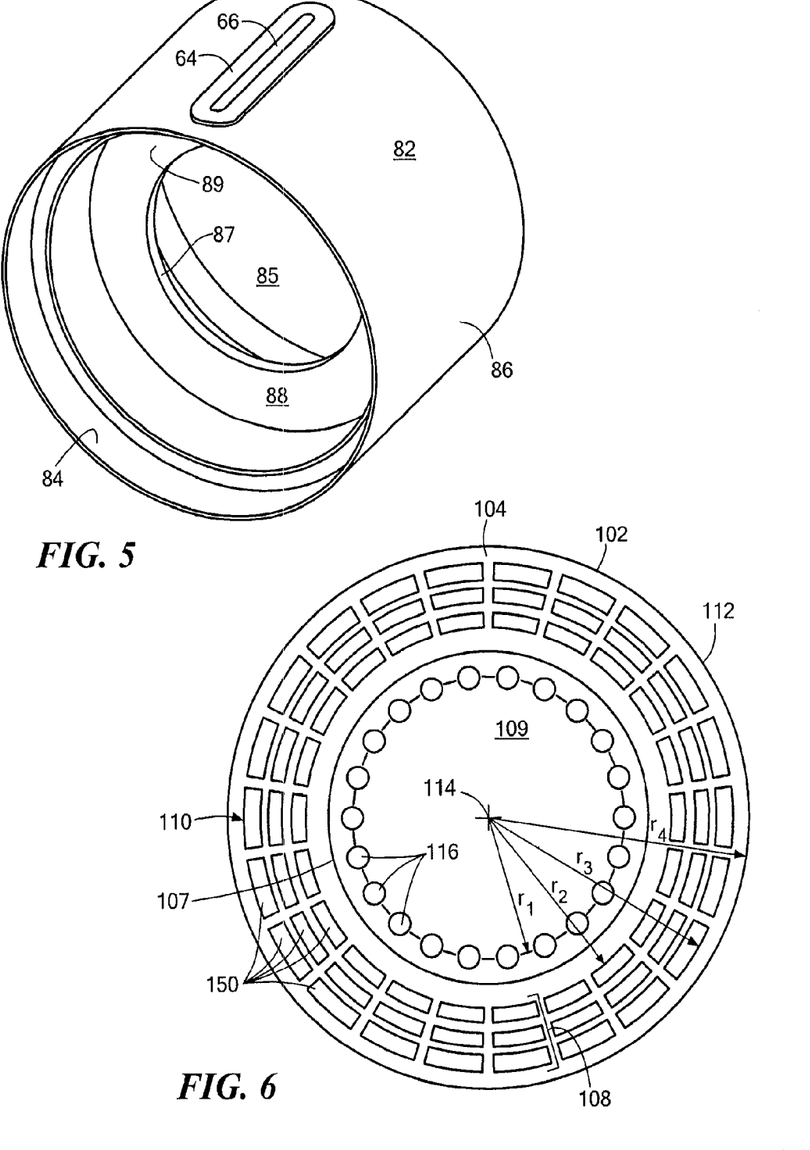
FIG. 5 is a perspective view of the generator rotor body.
FIG. 6 is an end view of the inner clamping plate.

Referring to FIG. 5, the rotor body 82 is a hollow cylindrical member that rigidly supports the rotor winding assembly 62 via the support tube 68, and transfers torque from the support tube 68 to the drive shaft 90. In addition, the rotor body 82 is formed of a ferromagnetic material, and thus provides a lower reluctance path for the magnetic field generated by the HTS windings 64 (only one HTS winding is shown in the figure), thereby increasing the amount of magnetic flux through the flux path linking the stator assembly 40. The rotor body 82 includes an outer surface 86 that confronts an inner surface of the cryostat 70, and an inner surface 84 that is opposed to the outer surface 86. The inner surface 84 of the rotor body 82 includes a flange 88 that protrudes radially inward. The flange 88 is disposed approximately at an axial midline of the rotor body 82, and extends in a circumferential direction about the inner surface 84. The flange 88 includes a contact portion 89 that corresponds to the radially-innermost portion of the flange 88. In cooperation with the torque limiting device 100, the flange 88 provides a rigid connection between the rotor body 82 and the drive shaft 90 as discussed further below.

Referring to FIGS. 4 and 6, the torque limiting coupling 100 is disposed in an area circumscribed by the rotor body, and couples the rotor body 82 to the drive shaft 90. Specifically, the torque limiting coupling is fixed to an end 94 of the drive shaft 90 and supports the rotor assembly 60 within the stator assembly 40. The coupling 100 includes inner and outer clamping plates 102, 122 which abut and confront the contact portion 89 of the flange 88. The inner and outer clamping plates 102, 122 are arranged in parallel, and the contact portion 89 of the flange 88 is sandwiched between the inner and outer clamping plates 102, 122.

The inner clamping plate 102 is generally circular in peripheral shape and includes a contact surface 104 which faces the contact portion 89 of the flange 88, and an outer surface 106 opposed to the contact surface 104. The inner clamping plate 102 is fixed to the end 94 of the drive shaft 90 along its outer surface 106. The central portion 109 of the contact surface 104 protrudes inward toward the flange 88. A peripheral edge of the central portion 109 defines a shoulder 107 having an outer diameter slightly less than that of the inner diameter of the flange 88 of the rotor body 82. In use, the central portion 109 is received within the opening 85 defined by innermost edge 87 of the flange 88. By positioning the central portion 109 of the inner clamping plate 102 within the opening 85, the inner clamping plate 102 is securely and accurately centered relative to the rotor body 82.

An array of non-threaded bolt holes 116 extend through the plate 102 between the contact and outer surfaces 104, 106. The bolt holes 116 are equidistantly arranged along a first radius r1 as measured from the plate center 114. In addition, an array 110 of friction pads 150 are arranged on the contact surface 104 in the vicinity of the peripheral edge 112 of the plate 102. The array 110 is disposed in a contact region 108 which is provided radially outward relative to the central portion 109, between a second radius r2 and a third radius r3. As seen in FIG. 6, r2>r1 and r4>r3, where r4 corresponds to the radius of the plate 102. In addition, the first radius r1 is greater than an outer diameter of the drive shaft 90. Note that FIG. 6 is not drawn to scale. For example, in the illustrated embodiment, r1=48 inches, r4=66 inches, (r3+r2)/2=60 inches and (r3−r2)=10 inches.

Referring to FIG. 6, the array of friction pads 150 is arranged in the contact region 108 on the outer periphery the contact surface 104 of each of the inner clamping plate 102. In the illustrated embodiment, the friction surface is provided as an array of relatively small friction pads 150, rather than as a single annular pad, for ease of manufacture and assembly, and to ensure an equal distribution of the load across the contact region 108.

Figure 7:
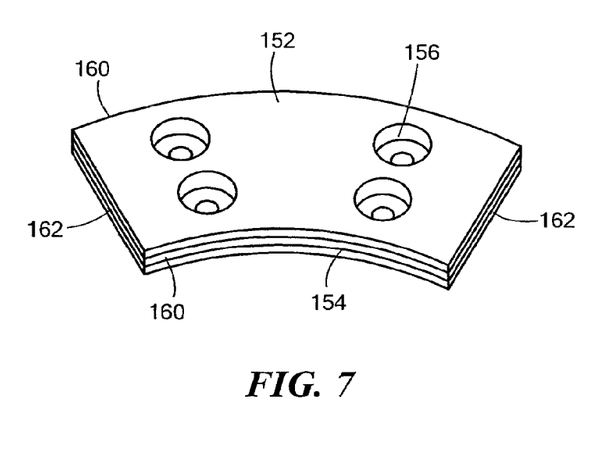
FIG. 7 is a perspective view of a friction pad.

Referring to FIG. 7, each friction pad 150 is shaped to accommodate the annular shape of the contact region 108 on the contact surface 104. That is, each friction pad 150 has an annular sector shape, including a pair of generally curved long edges 160 joined by shorter, linear edges 162. In the illustrated embodiment, the friction pads 150 are dimensioned such that the mean long edge 160 is about 4 inches in length, and the shorter edge 162 is about 2 inches in length.

In addition, each friction pad 150 includes a contact layer 152 formed on a steel carrier plate 154. The contact layer 152 is required to have excellent shock resistance, including resistance to cracking and breaking, excellent durability, and a consistently high coefficient of friction. For example, in this application, a coefficient of friction of 0.36 may be used. In some embodiments, the contact layer 152 is formed of a Kevlar® fiber composite that is often used in industrial break and clutch applications. In some embodiments, the contact layer 152 is formed of a material sold under the trademark Breaktex® P-42 from Tribco, Inc. of Cleveland, Ohio. Each friction pad 150 is mounted to the contact surface 104 of the clamping plates 102, 122 using bolts (not shown) received in countersunk bolt holes 156.

The outer clamping plate 122 is substantially similar in structure to that of the inner clamping plate 102, except for the configuration of the bolt holes 116. Thus common structures will be identified herein by common reference numbers, and the description of the outer clamping plate 122 will be omitted. In the outer clamping plate 122, the bolt holes 116 terminate within the outer clamping plate 122, and are threaded.

In the torque limiting coupling 100, the inner and outer clamping plates 102, 122 are arranged so that the contact portion 89 of the flange 88 is disposed between the respective contact surfaces 104 of inner and outer clamping plates 102, 122. More specifically, the contact portion 89 of the flange 88 is disposed between the respective arrays 110 of friction pads 150.

In addition, bolts 200 are provided within the bolt holes 116 so as to extend through the inner clamping plate 102 and engage the threaded bolt holes 116 of the outer clamping plate 122. In some examples, the bolts 200 are used with tensioners 210 of the type sold as part number SB12 under the trademark Superbolt®, which are manufactured by Superbolt, Inc. of Carnegie, Pa.

Figure 8:
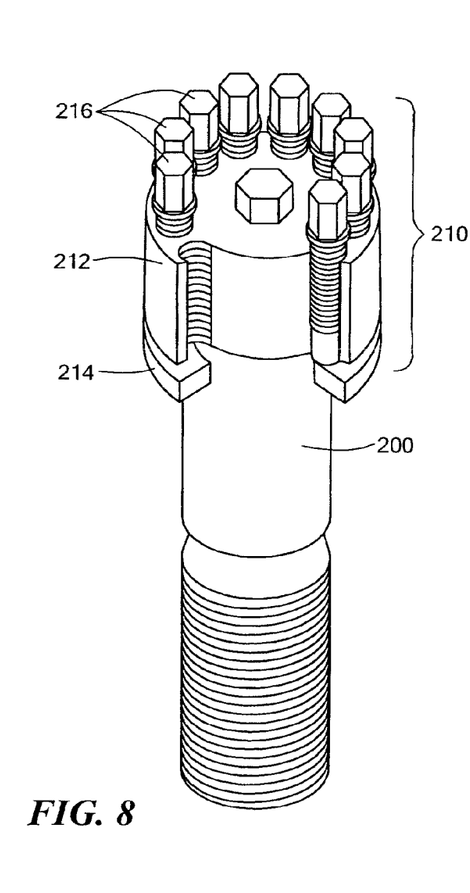
FIG. 8 is a perspective view of a tensioner showing a portion of the torque nut and drive washer in cut away view.

Referring to FIG. 8, Superbolt® tensioners 200 include a drive nut 212 dimensioned to be received on an end of the bolt 200, several smaller jackbolts 216 extending through the drive nut around the periphery of the bolt 200, and a washer 214 which provides a rigid, flat surface against which the jackbolts 216 are driven. In use, the drive nut 212 is hand tightened on the end of the bolt 200, and then the jackbolts 216 are tightened using hand tools. By doing so, each bolt 200 is easily and accurately loaded in pure tension.

The bolts 200 and tensioners 210 draw the outer and inner clamping plates 102, 122 toward each other whereby at least the portion between r2 and r4 of each of the outer and inner clamping plates is compressed against the contact portion 89 of the flange 90. The arrangement and configuration of the bolts 200 provide an even, consistent and well defined pressure to the array of friction pads 150. The even and consistent pressure ensures that an even load distribution is applied to the friction pads 150.

In the illustrated embodiment, the inner and outer clamping plates 102, 122 are pre-loaded in compression against the contact portion 89 of the flange 88 using the bolts 200. Due to the friction properties of the friction pads 150, the inner and outer clamping plates 102, 122 are fixed relative to the flange 88 for normal operating torques of the drive shaft 90. In the illustrated embodiment, the compression pre-load used is 750 psi. Moreover, the inner and outer clamping plates 102, 122 slip relative to the flange 88 for rotor shaft torques of a predetermined value or greater, defining a slip plane 124 within the coupling 100. In particular, when a sufficient torque is applied to the clamping plates 102, 122 via the drive shaft 90, the friction pads 150 slip relative to the surfaces 84, 86 of the flange 88 corresponding to the contact portion 89. In some embodiments, the clamping plates 102, 122 are configured to slip relative to the flange 88 for drive shaft torques of twice the normal operating torque.

In the event of a full-phase fault, the torque applied to the drive shaft 90 could be as high as 7 times the normal operating torque. Even faults of lesser magnitude, for example resulting in applied torques of 2 times the normal operating torque, can result in costly damage to the wind turbine 10. The torque limiting coupling 100 serves to ensure that the rotor assembly 60, the stator assembly 40 and nacelle 26 do not fail in the event of system faults.

A selected illustrative embodiment of the torque limiting coupling 100 for use in the generator 30 is described above in some detail. While this working example of the present invention has been described above, the present invention is not limited to the working example described above, but various design alterations may be carried out without departing from the present invention as set forth in the claims.

For example, the rotor assembly as described herein is not limited to use in a generator, can be used in other types of rotating electrical machines, including motors.

For another example, the generator 30, including the torque limiting coupling 100, is not limited to the scale, loads and dimensions described herein, which were provided only for purposes of illustration.

In addition, it should be understood that only structures considered necessary for clarifying the present invention have been described herein. Other conventional structures, and those of ancillary and auxiliary components of the system, are assumed to be known and understood by those skilled in the art.

What is claimed is:

1. Power train of a wind power plant comprising:
   a turbine rotor including a hub and blades supported on the hub, and
   a generator including a stator and a generator rotor rotatably disposed within the stator, the generator rotor including
      a rotor shaft,
      a generator rotor body, the rotor body including a hollow cylindrical portion, and a flange that protrudes radially inward from an inner surface of the cylindrical portion, the flange extending circumferentially about the inner surface, and
      a torque limiting device connecting the generator rotor body to the rotor shaft, the torque limiting device configured to support the generator rotor body within the stator and allow coaxial rotation of the rotor body relative to the stator, the torque limiting device including
         inner and outer clamping plates, the clamping plates arranged so that a portion of the flange is disposed between the outer and inner clamping plates.

2. The power train of claim 1 wherein the hub and the generator rotor are connected by the rotor shaft, and the rotor shaft rotates at the same frequency as the hub.

3. The power train device of claim 1 wherein the torque limiting device is further configured to disconnect the generator rotor body from the rotor shaft at a predetermined rotor shaft torque.

4. The power train device of claim 1 wherein the torque limiting device includes a slip plane.

5. The power train device of claim 1 wherein the torque limiting device includes a slip plane disposed between the rotor body and the rotor shaft.

6. The power train of claim 1 wherein the generator rotor body further includes
   a fastener configured to draw the outer and inner clamping plates toward each other whereby a portion of each of the outer and inner clamping plates abuts the portion of the flange,
   wherein the inner clamping plate is fixed to the generator rotor shaft, and
   the inner and outer clamping plates are fixed relative to the flange for rotor shaft torques of less than a predetermined value, and the inner and outer clamping plates slip relative to the flange for rotor shaft torques of at least a predetermined value.

7. The power train of claim 6 wherein the portion of the inner and outer clamping plates comprises a friction pad attached to a surface thereof.

8. The power train of claim 6 wherein the portion of the inner and outer clamping plates comprises an array of friction pads attached to a surface thereof.

9. The power train of claim 6 wherein the fastener comprises bolts configured to uniformly distribute a compression load across the respective portions of the inner and outer clamping plates and the flange.

10. A rotor assembly of an electric rotating machine, the rotor assembly comprising:
    a rotor shaft;
    a rotor body coaxial with and coupled to the rotor shaft, the rotor body including hollow cylindrical portion, and a flange that protrudes radially inward from an inner surface of the cylindrical portion, the flange extending circumferentially about the inner surface; and
    a rotor support member configured to support the rotor body relative to the rotor shaft, the rotor support member including a torque limiting device configured to decouple the rotor body from the rotor shaft at a predetermined level of torque, wherein the torque limiting device includes
       inner and outer clamping plates, the clamping plates arranged so that a portion of the flange is disposed between the outer and inner clamping plates.

11. The rotor assembly of claim 10, wherein the torque limiting device is disposed within the rotor assembly in an area circumscribed by the rotor body, the torque limiting device connecting the rotor body and the rotor shaft.

12. The rotor assembly of claim 10 wherein the rotor body further includes
    a fastener configured to draw the outer and inner clamping plates toward each other whereby a portion of each of the outer and inner clamping plates abuts the portion of the flange,
    wherein the inner clamping plate is fixed to the rotor shaft, and the inner and outer clamping plates are fixed relative to the flange for rotor shaft torques of less than a predetermined value, and the inner and outer clamping plates slip relative to the flange for rotor shaft torques of at least a predetermined value.

13. The power train of claim 12 wherein the portion of the inner and outer clamping plates comprises an array of friction pads attached to a surface thereof.

14. The power train of claim 12 wherein the fastener comprises bolts configured to uniformly distribute a compression load across the respective portions of the inner and outer clamping plates and the flange.

15. An electric rotating machine comprising:
a stator assembly;
a rotor assembly rotatably and coaxially disposed within the stator assembly, the rotor assembly including
a rotor body, the rotor body including a hollow cylindrical portion, and a flange that protrudes radially inward from an inner surface of the cylindrical portion, the flange extending circumferentially about the inner surface;
a rotor shaft coincident with a longitudinal axis of the rotor body; and
a torque limiting device disposed within the rotor assembly in an area circumscribed by the rotor body, the torque limiting device connecting the rotor body and the rotor shaft and configured to decouple the rotor body from the rotor shaft at a predetermined level of torque, wherein the torque limiting device includes
inner and outer clamping plates, the clamping plates arranged so that a portion of the flange is disposed between the outer and inner clamping plates.

16. The electric rotating machine of claim 15 wherein the rotor body further includes
a fastener configured to draw the outer and inner clamping plates toward each other whereby a portion of each of the outer and inner clamping plates abuts the portion of the flange,
wherein the inner clamping plate is fixed to the rotor shaft, and
the inner and outer clamping plates are fixed relative to the flange for rotor shaft torques of less than a predetermined value, and the inner and outer clamping plates slip relative to the flange for rotor shaft torques of at least a predetermined value.

17. The power train of claim 16 wherein the portion of the inner and outer clamping plates comprises an array of friction pads attached to a surface thereof.

18. The power train of claim 16 wherein the fastener comprises bolts configured to uniformly distribute a compression load across the respective portions of the inner and outer clamping plates and the flange.

* * * * *